United States Patent
Raynor et al.

(10) Patent No.: US 8,922,682 B2
(45) Date of Patent: Dec. 30, 2014

(54) ELECTRONIC DEVICE WITH AN ARRAY OF DAISY CHAINED IMAGE SENSORS AND ASSOCIATED METHODS

(71) Applicant: STMicroelectronics (Research & Development) Limited, Marlow Bucks (GB)

(72) Inventors: Jeffrey Raynor, Edinburgh (GB); Patrick Baxter, Edinburgh (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 0 days.

(21) Appl. No.: 14/079,263

(22) Filed: Nov. 13, 2013

(65) Prior Publication Data

US 2014/0063559 A1  Mar. 6, 2014

Related U.S. Application Data

(63) Continuation of application No. 12/952,918, filed on Nov. 23, 2010, now Pat. No. 8,610,805.

(30) Foreign Application Priority Data

Nov. 23, 2009  (GB) .................................. 0920434.8

(51) Int. Cl.

| | |
|---|---|
| *H04N 9/09* | (2006.01) |
| *H04N 5/232* | (2006.01) |
| *H04N 5/76* | (2006.01) |
| *H04N 1/46* | (2006.01) |
| *H04N 1/193* | (2006.01) |
| *H04N 5/341* | (2011.01) |
| *H04N 5/376* | (2011.01) |
| *H04N 1/03* | (2006.01) |

(52) U.S. Cl.
CPC ............. *H04N 1/193* (2013.01); *H04N 5/3415* (2013.01); *H04N 5/376* (2013.01); *H04N 1/03* (2013.01)
USPC ...................... 348/262; 348/211.2; 348/231.6; 358/514

(58) Field of Classification Search
USPC .......... 348/211.5, 211.11, 211.14, 231.6, 262, 348/264, 332; 358/514, 482, 483
See application file for complete search history.

(56) References Cited

U.S. PATENT DOCUMENTS

| | | | |
|---|---|---|---|
| 4,570,215 A | 2/1986 | Miura et al. | |
| 6,014,160 A * | 1/2000 | Tewinkle et al. | ............. 358/482 |

(Continued)

FOREIGN PATENT DOCUMENTS

| | | |
|---|---|---|
| EP | 1667428 | 6/2006 |
| JP | 05090559 | 4/1993 |

(Continued)

OTHER PUBLICATIONS

Translation of JP 2006-075489 A; Mar. 2006.*

(Continued)

*Primary Examiner* — John Villecco
(74) *Attorney, Agent, or Firm* — Allen, Dyer, Doppelt, Milbrath & Gilchrist, P.A.

(57) ABSTRACT

An electronic device includes an array of daisy chained image sensors, with each image sensor including a pixel array. A host is coupled to an image sensor at an end of the array and is configured to insert identification codes. The identification codes include embedded data values to thereby indicate specific parts of the image data, and a set of identification codes comprising a first identification code to identify a start of a data stream and a second identification code to identify an end of the data stream.

26 Claims, 6 Drawing Sheets

(56) References Cited

U.S. PATENT DOCUMENTS

| | | | |
|---|---|---|---|
| 6,061,089 | A | 5/2000 | Tonkin et al. |
| 6,553,437 | B1 | 4/2003 | Aswell et al. |
| 7,164,506 | B2 * | 1/2007 | TeWinkle ............... 358/474 |
| 7,657,330 | B2 | 2/2010 | Morrison |
| 7,939,788 | B2 * | 5/2011 | Tewinkle ............... 358/482 |
| 7,969,469 | B2 | 6/2011 | Guidash |
| 8,212,197 | B2 * | 7/2012 | Tewinkle ............... 358/482 |
| 8,421,001 | B2 * | 4/2013 | Albrecht ............... 250/227.11 |
| 8,593,699 | B2 * | 11/2013 | Hasuo et al. ........... 358/513 |
| 8,643,918 | B2 * | 2/2014 | Sasaki ................... 358/483 |
| 2002/0060738 | A1 | 5/2002 | Hong |
| 2003/0030725 | A1 * | 2/2003 | Broemmelsiek et al. ..... 348/372 |
| 2003/0123106 | A1 | 7/2003 | Sawada |
| 2003/0141906 | A1 | 7/2003 | Tumer et al. |
| 2004/0017486 | A1 | 1/2004 | Cooper et al. |
| 2006/0158548 | A1 | 7/2006 | Broemmelsiek |
| 2008/0088715 | A1 | 4/2008 | Hagiwara |
| 2009/0033779 | A1 | 2/2009 | Mo |
| 2009/0268065 | A1 | 10/2009 | Fereyre |
| 2010/0020173 | A1 | 1/2010 | Marquart et al. |
| 2012/0131231 | A1 | 5/2012 | Monreal |

FOREIGN PATENT DOCUMENTS

| | | | |
|---|---|---|---|
| JP | 2003069986 | | 3/2003 |
| JP | 2005268882 | | 9/2005 |
| JP | 2006075489 | | 3/2006 |
| KR | 2002039185 | A * | 5/2002 |
| KR | 20020039185 | | 5/2002 |

OTHER PUBLICATIONS

Wolfson Microelectronics: "60MSPS 3-Channel AFE With Multiple Device Operation and Programmable Automatic Black Level Calibration", Product Datasheet, Jul. 2009, pp. 1-49.

* cited by examiner

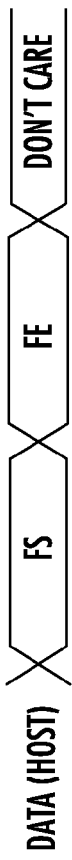
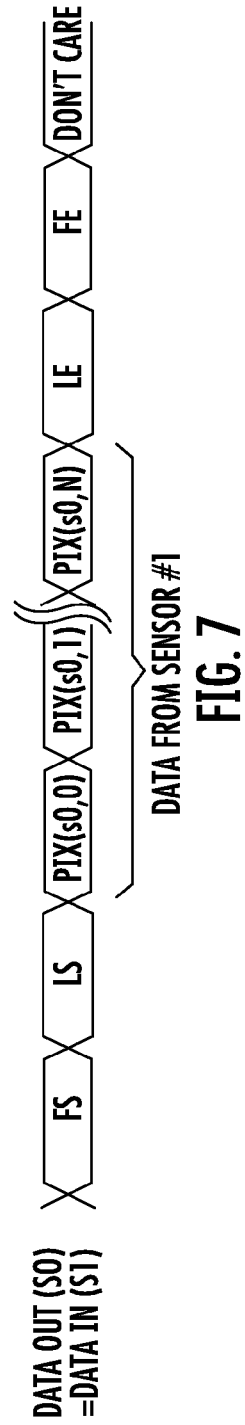
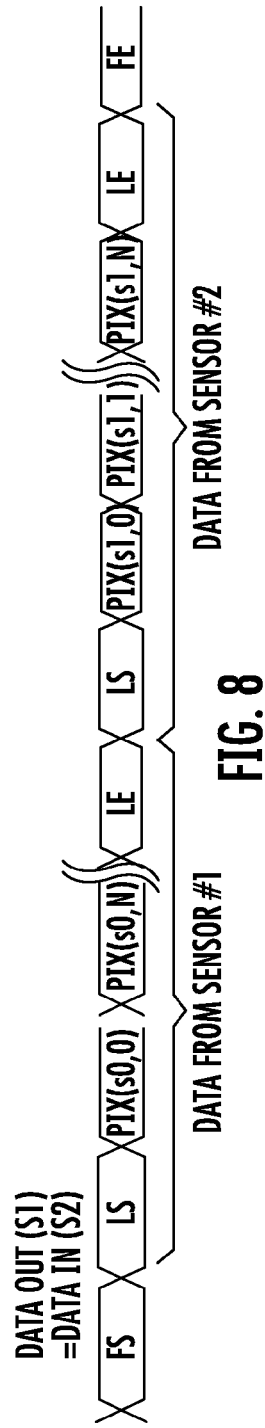
FIG. 6
FIG. 7
FIG. 8

ELECTRONIC DEVICE WITH AN ARRAY OF DAISY CHAINED IMAGE SENSORS AND ASSOCIATED METHODS

FIELD OF THE INVENTION

The present invention relates to image sensor arrays and, in particular, to arrays of solid state image sensors including but not limited to CCD and CMOS image sensors.

BACKGROUND OF THE INVENTION

Digital image sensing based upon solid state technology is well known, the two most common types of image sensors currently being charge coupled devices (CCD's) and complementary metal oxide semiconductor (CMOS) image sensors. Digital image sensors are incorporated within a wide variety of devices throughout the consumer, industrial and defense sectors among others.

An image sensor is a device comprising one or more radiation sensitive elements having an electrical property that changes when radiation is incident upon them, together with circuitry for converting the changed electrical property into a signal. As an example, an image sensor may comprise a photodetector that generates a charge when radiation is incident upon it. The photodetector may be designed to be sensitive to electromagnetic radiation in the range of (human) visible wavelengths, or other neighboring wavelength ranges, such as infra red or ultra violet for example. Circuitry is provided that collects and carries the charge from the radiation sensitive element for conversion to a value representing the intensity of incident radiation.

Typically, more than one radiation sensitive element may be provided in an array. The term pixel is used as a shorthand for picture element. In the context of a digital image sensor, a pixel refers to that portion of the image sensor that contributes one value representative of the radiation intensity at that point on the array. These pixel values are combined to reproduce a scene that is to be imaged by the sensor. A plurality of pixel values can be referred to collectively as image data. Pixels may be formed on and/or within a semiconductor substrate. In fact, the radiation sensitive element comprises a part of the pixel, and part of the pixel's surface area (the proportion of the pixel area that the radiation sensitive element takes up is known as the fill factor). Other parts of the pixel are taken up by metallization such as transistor gates and so on. Other image sensor components, such as readout electronics, analog to digital conversion circuitry and so on may be provided at least partially as part of each pixel, depending on the pixel architecture.

Various applications use a number of image sensors to produce a composite image. In these applications the interconnection of data between the image sensors is a significant issue, particularly in the case of pixel arrays having many thousand or many million pixels, as are increasingly commonplace.

SUMMARY OF THE INVENTION

According to a first aspect of the invention there is provided an array of daisy chained image sensors, each image sensor comprising a pixel array. Optionally, each image sensor in the array is arranged to receive as an input a set of data, and to transmit as an output the input set of data together with image data generated by the image sensor from the pixel array.

Optionally, a downstream image sensor appends its data after an upstream image sensor. The "downstream" and "upstream" positions of the sensors in the array can be defined in terms of a scanning direction of the array, with an "upstream" image sensor scanning an image in advance of a "downstream" image sensor.

Optionally, each image sensor in the array comprises a separate clock input port and clock out port. Optionally, each image sensor in the array is arranged to perform a phase adjustment to an input clock signal and ensures that the output data and output clock are synchronous.

Optionally, a host is provided and is daisy chained to an image sensor at one end of the array. Optionally the host is daisy chained to a first image sensor at a first end of the image sensor array and to a second image sensor at the other end of the image sensor array.

Optionally the host is configured to define predetermined embedded data values to indicate specific parts of the data stream, the specific parts preferably including a line start and a line end point, and may also optionally include a frame start point and a frame end point.

The embedded data values are optionally chosen to be values that are distinguishable from image data. The values optionally correspond to image data values that do not occur in everyday use case scenarios, optionally comprising a maximum red and zero or minimal green/blue pixel values.

Optionally the image sensors in the array have an equal number of pixels, and are optionally generally identical. Optionally a programmable gain amplifier is provided for at least one image sensor to adjust its gain. A plurality of programmable gain amplifiers can be controlled by the host.

Optionally the image sensors are addressed using an identification value unique to each sensor and based upon the number of image data values that pass through the sensor.

Optionally, the identification value is equal to the number of image data values. Optionally, the identification value is a number smaller than the number of image data values. Optionally, the identification value is derived by dividing the number of image data values output by an image sensor by the number of corresponding pixels of the image sensor.

Optionally, when an image sensor comprises $2^N$ pixels, the identification value is derived from the number of image data values output by the image sensor by discarding the first N bits of image data.

Optionally, when an image sensor comprises $2^N+1$ pixels, the identification value is derived from the number of image data values output by the image sensor by using a set of the least significant bits of the image data. Optionally, the identification value is derived by summing the individual digits in the number of the image data.

According to a second aspect of the invention there is provided an image sensor with a pixel array, a data input port and a data output port, the image sensor being operable to daisy chain image data between image sensors in an array. Optionally, the image sensor comprises a separate clock input port and clock out port.

According to a third aspect there is provided a method of transmitting data in an array of image sensors, each image sensor comprising a pixel array, the method comprising the step of daisy chaining image data between image sensors in the array.

Optionally, each image sensor in the array receives as an input a set of data and transmits as an output the input set of data together with image data generated by the image sensor from the pixel array.

Optionally, a downstream image sensor appends its data after an upstream image sensor. The "downstream" and "upstream" positions of the sensors in the array can be defined in terms of a scanning direction of the array, with an "upstream" image sensor scanning an image in advance of a "downstream" image sensor.

Optionally, each image sensor in the array comprises a separate clock input port and clock out port. Optionally, each image sensor in the array performs a phase adjustment to an input clock signal and ensures that the output data and output clock are synchronous.

Optionally, a host is provided and is daisy chained to an image sensor at one end of the array. Optionally the host is daisy chained to a first image sensor at a first end of the image sensor array and to a second image sensor at the other end of the image sensor array.

Optionally the host defines predetermined embedded data values to indicate specific parts of the data stream, the specific parts preferably including a line start and a line end point, and optionally also a frame start point and a frame end point.

The embedded data values are optionally chosen to be values that are distinguishable from image data. The values optionally correspond to image data values that do not occur in everyday use case scenarios, optionally comprising a maximum red and zero or minimal green/blue pixel values.

Optionally the image sensors in the array have an equal number of pixels, and are optionally generally identical. Optionally the gain of each image sensor is adjusted, optionally under the control of the host.

Optionally the image sensors are addressed using an identification value unique to each sensor and based upon the number of image data values that pass through the sensor.

Optionally, the identification value is equal to the number of image data values. Optionally, the identification value is a number smaller than the number of image data values. Optionally, the identification value is derived by dividing the number of image data values output by an image sensor by the number of corresponding pixels of the image sensor.

Optionally, when an image sensor comprises $2^N$ pixels, the identification value is derived from the number of image data values output by the image sensor by discarding the first N bits of image data.

Optionally, when an image sensor comprises $2^N+1$ pixels, the identification value is derived from the number of image data values output by the image sensor by using a set of the least significant bits of the image data. Optionally, the identification value is derived by summing the individual digits in the number of the image data.

BRIEF DESCRIPTION OF THE DRAWINGS

The present invention will now be described, by way of reference only, with reference to the accompanying drawings in which:

FIG. 6 illustrates the data output from the host shown in FIG. 2 in another example;

FIG. 7 illustrates an example data output from a first sensor shown in FIG. 2;

FIG. 8 shows an example data output from a second sensor shown in FIG. 2;

DETAILED DESCRIPTION OF THE PREFERRED EMBODIMENTS

One product that makes use of digital image sensors is a document scanner. The most popular document scanner for the consumer market is the flat bed scanner, which can be provided either as a stand alone device or incorporated into a printer or other office document processing device which can perform other functions such as printing, faxing and so on.

Flat bed scanners are a useful tool for imaging paper documents because they provide a high resolution, accurate representation of the image.

Some types of scanners use single image sensors, including for example digital still cameras, drum scanners or single chip linear scanners.

The pixel count of digital still cameras is increasing all the time. At the time of writing it is common to have at least a 10 Megapixel resolution, and larger arrays will become more commonplace in the future. However, these still have lower resolution than line scanners and are also more expensive.

Drum scanners are often confined to professional facilities as the technique involves putting the paper on a drum and spinning it past a single sensor in a scanning operation. Although this produces the highest quality of output, the mechanical size and operation may preclude them from mainstream consumer applications.

Single chip linear scanners are usually provided with an optical system to match the object size (for example a sheet of A4 paper) to the image size (for example a 42 mm CCD array). The optical system uses space which increases the size of the system, and the long thin arrays are difficult to manufacture and assemble.

Furthermore, most of the above devices are CCD type devices. The charge transfer efficiency of CCD sensors places limitations on the number of shifts of data that can be carried out, putting a practical limit on the number of pixels and the size of the devices.

Figure 1:
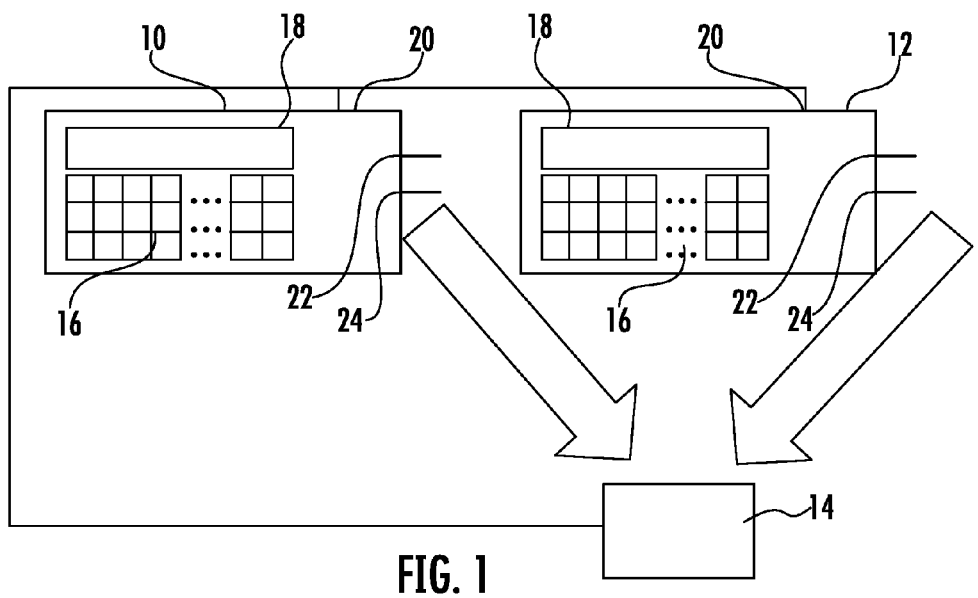
FIG. 1 shows a butted linear array of image sensors, according to the prior art.

The other main imaging technique in flat bed scanners is to use multiple sensors placed adjacent to each other and aligned on a common axis. The sensors can be linear (1D) arrays or 2D arrays. This is referred to as a butted array. An example of a butted array is shown in FIG. 1. A first image sensor 10 and second image sensor 12 are connected in a star configuration with a host 14. In this embodiment the first and second image sensors 10, 12 are of identical construction, including an array of pixels 16, circuitry 18 comprising analogue to digital conversion and/or readout circuitry, a control interface 20, data output 22 and clock 24. The outputs from the data output 22 and clock 24 are fed to the host 14, as shown by the wide arrows. Each sensor 10, 12 comprises a single image data output 22 and has its own associated set of image data. It is to be appreciated that FIG. 1 is schematic only. The distance between the pixels of adjacent sensors is minimised to reduce dead spots in the imaging zone. Also, FIG. 1 shows two image sensors, however it will be appreciated that this is for ease of illustration and to show the general principle. The array may comprise (many) more than two sensors.

Butting sensors in this way has some advantages as compared with providing a single sensor. The butted component sensors have a reduced length as compared with the overall length that a single sensor of the same array dimensions would have, and so, relatively speaking, the aspect ratio is reduced which results in increased mechanical stability for the device. Further, the area of each device is reduced and so the yield can be increased, effectively lowering the cost of production. Sensor butting may be used for 2D and 1D arrays. In medical X-ray imaging it is common to use butted arrays of 2D sensors to image a whole image limb, abdomen and torso in a single exposure, for example.

There are however interconnection issues with this type of array, in particular when the image sensors have a large number of pixels (consider for example a 5 Megapixel sensor operating at thirty frames per second with a 10-bit output data bus. This uses a data output rate of 5 E6*30*10=1.5 Gbps. This is very high and it is common for there to be multiple data output paths (i.e. two or more channels) for a single 2D sensor in order to cope with this read out rate.

The present disclosure in its most general form relates to the daisy chaining of image sensors, and in particular to the daisy chaining of image data generated by the image sensors.

Two or more devices or circuits can be considered to be daisy chained when they are directly wired or logically connected to each other, rather than to a separate signal or control bus. In that case, the output of one device is the input of another. Daisy chained devices can be connected in a linear topology or a ring topology. The present disclosure applies to both implementation options.

The present disclosure also teaches optional embodiments for pixel addressing which are advantageous for cases where an image sensor has a large number pixels, for example many thousand or many million pixels. For these large pixel arrays, including 1D or 2D arrays, the amount of image data to be transferred is so large that normal daisy chaining is impractical, because the total image transfer time would be very long.

Figure 2:
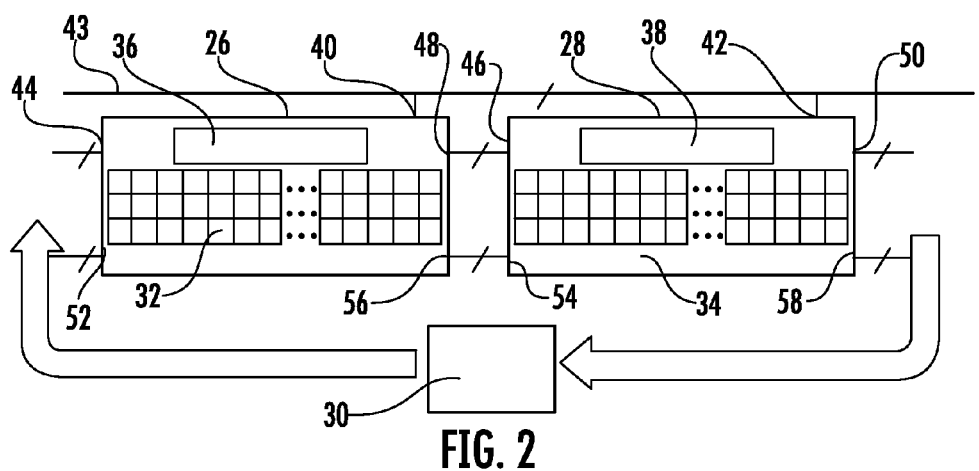
FIG. 2 shows an array of sensors which are daisy chained in accordance with a first embodiment of the present invention.

A first embodiment of the disclosure is shown in FIG. 2. This diagram shows two image sensors 26, 28 daisy chained together which operate in conjunction with a host 30. It will be appreciated that FIG. 2 illustrates the principles of the embodiment and that of course, the principles of FIG. 2 could be extended for the daisy chaining and the connection of (many) more than two sensors.

Each of the sensors comprises a pixel array 32, 34, readout electronics comprising analogue to digital conversion circuitry and/or other readout circuitry 36, 38 and control ports 40, 42 which provide control signals from a control bus 43. In contrast to the sensors 10, 12 shown in FIG. 1, the sensors 26, 28 of FIG. 2 comprise data input ports 44, 46 in addition to data output ports 48, 50, and have separate clock in ports 52, 54 and clock out ports 56, 58. It will be understood that the term "port" is used here in a general sense to refer to any suitable terminal, and is taken to be equivalent to a pin, a pad or a signal line. The choice of terminal implementation depends on the particular type of sensors being used and the context of their application.

The control connections 40, 42 can be common to all sensors and any suitable protocol may be employed, for example Inter-IC Communications (I²C), System Management Bus (SMbus), Serial Peripheral Interface (SPI) or Compact Camera Protocol (CCP).

The system clock can be generated from the host 30. The host 30 does not have to generate any data for the "data in" port 44 of the first sensor in the array (shown as 26 in FIG. 2). However, it may in some embodiments be helpful to transmit an identification code such as a line start (LS) indicator and a line end (LE) indicator with no data in between. This will be discussed in more detail below.

In a preferred embodiment each of the sensors 26, 28 comprises a clock output 56, 58. This is derived from the input clock and may usually be at the same frequency, but can advantageously be retimed, i.e. phase adjusted, to ensure that the output data and the output clock are synchronous. This prevents any propagation delay from a single device from accumulating over a large number of sensors which would result in skewing between the data and the clock signals.

The figures illustrate a ring type topology where the host is daisy chained to a first image sensor at a first end of the image sensor array and to a second image sensor at the other end of the image sensor array. It will be apparent to those skilled in the art that the host could also be connected to only one image sensor, forming a linear daisy chain, with the image sensor design of the figures being suitably modified.

The clock signal can be daisy chained with little difficulty as it comprises very little information. However, in order to daisy chain the image data it is in various embodiments advantageous to employ special techniques with regards to data timing and sensor address assignment.

In order to prevent corruption of the image data, each image sensor adds its data to the stream of data at the appropriate time. In an optical array there is a scanning direction and it is preferable to have the "downstream" sensors append their data after the "upstream" ones. In this way, data from the image sensors can be presented to the host 30 as a long uninterrupted data stream.

An efficient mechanism to achieve this is to use special identification codes that comprise embedded data values, in order to label chosen points within the data stream. The embedded data values can comprise in preferred embodiments representative sensor readings or patterns of readings that would not occur in everyday use case scenarios.

For example, in the case of a color image sensor which has different red, green and blue (R, G, and B) output channels, a maximum intensity of red, in combination with a minimum intensity of green and blue may never occur as a normal output. This color does not exist in the real world, as in practice there may always be some green and/or blue output signal in an imaged scene. These values can then be used in the data stream as embedded data values that can function as identification codes for an indication of a line start (LS) or a line end (LE). The other of the LS or LE can then be indicated by a further arbitrary value in which either the maximum intensity red value is decreased by one or the zero green and/or blue values are increased by one. These values may also not be present in a practical real world setting.

It will be appreciated that any data values that are distinguishable from "real world" situations or normal use case scenarios for a particular image sensor can be used as the basis for the identification codes.

The values could be chosen to be absolute values, or in an alternative embodiment a plurality of values can be chosen representing a pattern of data that would not be present in "real world" situations or normal use case scenarios. For example, in a monochrome image sensor a particular pattern of alternating black and white can be used.

In one embodiment, identification codes can be provided that define a line start (LS) and/or a line end (LE). In a further embodiment, further identification codes can be used in addition to the LS and LE codes, for example a frame start (FS) and/or a frame end (FE) code can be provided.

The terms "line" or "frame" as used above can refer to any chosen series of image data derived from an image sensor. In the case of a linear (1D) image sensor, the line can be defined as the set of pixel values from the entire pixel array. In the case of a 2D pixel array, a line can be defined as the set of pixel values from the entire pixel array. Alternatively, a line can be defined as the complete set of pixel values from each color channel of the array. As a still further alternative, a line can be defined as the set of pixels in a row of the array, optionally grouped further by color channel. It is also possible for each "sensor" in the array to actually be comprised of two or more separate sensors, with corresponding parts of the sensors selected and in combination forming a "line". An example of this would be a stereoscopic vision system with two sensors, where each line of data can comprise outputs from the portions of two sensors that image the same region of space, and so "line" in the context of the invention may incorporate sensor array rows from multiple sensors. In all of the above examples, a number of lines could be defined as subsets of the complete sets mentioned. The most important function of the line start and line end identifiers is to signal to the host the start and end points of the entire data stream, however the various different line start and line end definitions mentioned above may be used for other computational variations.

Figure 3:
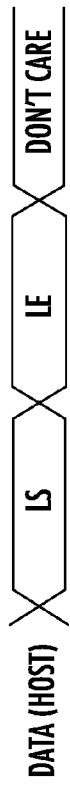
FIG. 3 illustrates the data output from the host shown in FIG. 2 in one example.

FIG. 3 shows a possible data output from the host. As the host does not have a sensor it cannot output any image data, however it can output an identification code indicating the start of a string of data, in this example a line start signal (LS), followed immediately by a second identification code indicating the end of a stream of data, in this example a line end signal (LE). For ease of illustration in FIG. 3, each of the identification codes is shown as a single data packet, however it will be appreciated that the identification codes may comprise multiple bytes of data, according to the specific implementation. As seen in FIG. 2, the data output from the host 30 is also the data input to the first sensor 26 in the daisy chain.

Figure 4:
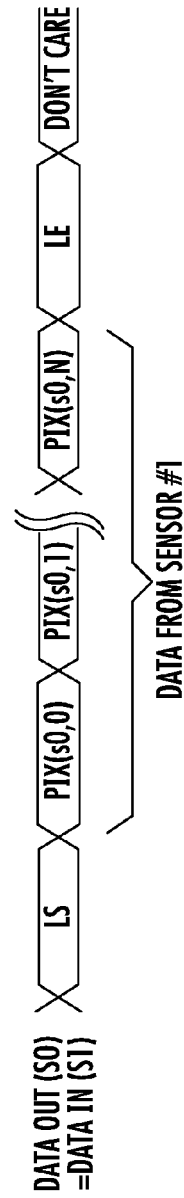
FIG. 4 illustrates an example data output from a first sensor shown in FIG. 2.
Figure 5:
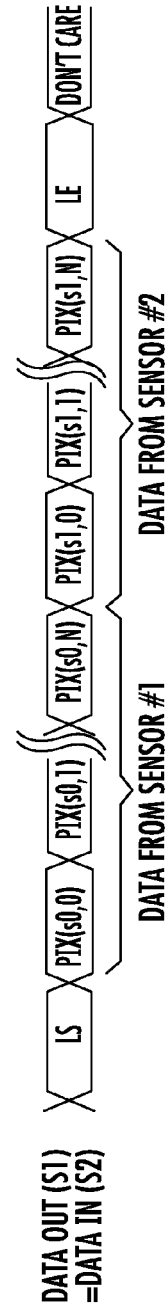
FIG. 5 shows an example data output from a second sensor shown in FIG. 2.

In one embodiment, a set of identification codes is provided, a first identification code being used to identify the start of the sensor array data stream, and a second identification code being used to identify the end of the sensor array data stream. These are shown in FIGS. 3-5 as line start (LS) and line end (LE) codes respectively. It will be appreciated that the names of these identification codes could be changed. In particular, they could equally be referred to as "frame" start and end codes.

Each of the sensors in the daisy chain monitors and replicates the input data stream up to the point at which the identification code identifying the end of the array's data stream is to be generated. However, instead of outputting the identification code at that point, the sensor appends its own image data to the output data stream and then appends a data packet comprising the identification code. This operation is shown in FIG. 4, where the output from the first sensor 26 (see FIG. 2) is shown. In the notation of FIG. 4, pix(sa, b) refers to the pixel number b from sensor (s) number a. Note that the data output from the first sensor 26 (s0) is equivalent to the data input to the second sensor 28 (s1).

FIG. 5 shows the data output from the second sensor 28 (s1). The data from the second sensor 28 appears after the data from the first sensor 26. The host 30 receives a long uninterrupted line of data.

This technique is extendable without the need to configure the sensor either during manufacture of the sensor or by setting various address bits to the sensor.

As a further optional feature, a second set of identification codes can be used, repeatedly if necessary, within the datastream to identify the start and end points of the data streams associated with each image sensor. This second set of identification codes can, unlike the identification codes that are used to identify the start and end points of the entire array data stream, are not removed by the successive sensors in the daisy chain but instead remain embedded, in that sense being "fixed".

An embodiment comprising these identification codes is illustrated in FIGS. 6 to 8. In this embodiment, a first set of identification codes used to identify the start and end points of the entire array data stream is denoted by frame start (FS) and frame end (FE) codes respectively, and a second set of identification codes used to identify the start and end points of the data streams associated with each image sensor is denoted by line start (LS) and line end (LE) codes respectively.

The frame start (FS) identification code is in fact optional in this and similar embodiments. The host would detect the first LS and know there is valid data. It would continue to process the data until it saw a frame end (FE) code.

FIG. 6 shows a possible data output from the host. As the host does not have a sensor it cannot output any image data, however it can output an identification code indicating the start of a string of data, in this example a frame start signal (FS), followed immediately by a second identification code indicating the end of a stream of data, in this example a frame end signal (FE). For ease of illustration in FIG. 6, each of the identification codes is shown as a single data packet, however it will be appreciated that the identification codes may comprise multiple bytes of data, according to the specific implementation. As seen in FIG. 2, the data output from the host 30 is also the data input to the first sensor 26 in the daisy chain.

Each of the sensors in the daisy chain monitors and replicates the input data stream up to the point at which the identification code identifying the end of the array's data stream is to be generated. At that point, the sensor appends line start (LS) identification code followed by its own image data, then its line end (LE) identification code, before finally appending a data packet comprising the frame end (FE) identification code. This operation is shown in FIG. 7, where the output from the first sensor 26 (see FIG. 2) is shown. In the notation of FIG. 7, pix(sa, b) refers to the pixel number b from sensor (s) number a. Note that the data output from the first sensor 26 (s0) is equivalent to the data input to the second sensor 28 (s1).

FIG. 8 shows the data output from the second sensor 28 (s1). The data from the second sensor 28 appears after the data from the first sensor 26. The host 30 receives a long uninterrupted line of data.

The embodiment of FIG. 6-8 is particularly useful for providing a host that can be generic to types of device where there is a wide range of screen sizes and/or a wide range of number of image sensors in a device. This technique would enable a single host to be able to communicate with a range of sensors S={1 to N} without the need to know the number of sensors in advance (e.g. during device design, manufacture or even module manufacture). The host could continue to read in the data, count the number of line end (LE) identification codes until it sees a frame end (FE) identification code, and as the number of LE codes corresponds to the number of sensors in the system, the host could easily determine this and use this information for data storage allocation and image processing, as it knows the number of pixels and can allocate resources efficiently, such as scaling any output movement appropriately, for example.

Further features of the disclosure can be understood from FIGS. 9 to 12.

Figure 9:
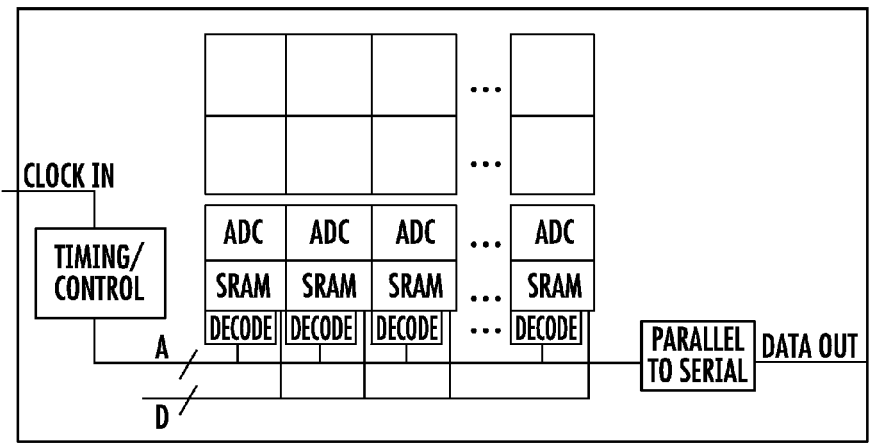
FIG. 9 shows an image sensor architecture, according to the prior art.
Figure 10:
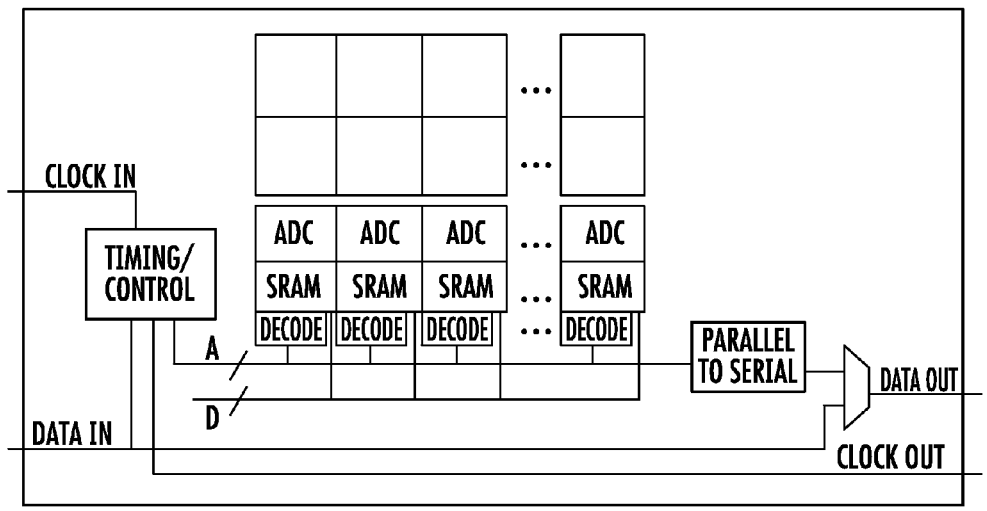
FIG. 10 shows a modified image sensor architecture, according to the present invention.

FIG. 9 shows the architecture of a conventional image sensor, while FIG. 10 shows an example of how this might be modified. In FIG. 9 and FIG. 10, "A" is the address bus used to select which pixel is to be read out and "D" is the data bus which carries the data output from the ADC stored in the SRAM (note that other types of memory apart from SRAM could be used). Note also that, instead of an address bus and decoder, a shift register could be used (for example, 100 . . . 0 shifted to 010 . . . 0 then to 001 . . . 0 where each bit is connected to the output enable of the column SRAM). Also, in a sensor with a large number of columns/SRAMs, instead of a single data bus, there could be several in a hierarchical fashion ("tree structure") which reduces parasitic loading.

One difference between FIG. 9 and FIG. 10 is the inclusion in the architecture of FIG. 10 of an input data path and a means to switch the output between the data from the "data in" path and the data from this devices ADC's SRAM.

It is also possible to provide a mechanism to synchronize the exposure of the sensors in an array so that the operation (especially the exposure and readout) of the device as a whole can be controlled. This mechanism may be provided by the host and/or by appropriate connections between the host and one or more of the image sensors in the array. A single signal "Frame Start" (FST) identification code may suffice. For example, the rising edge of this pulse could indicate the start of a frame. This can be used to trigger the output of data (from the previous exposure) and also the start of exposure (or the reset phase) of the next frame.

Figure 11:
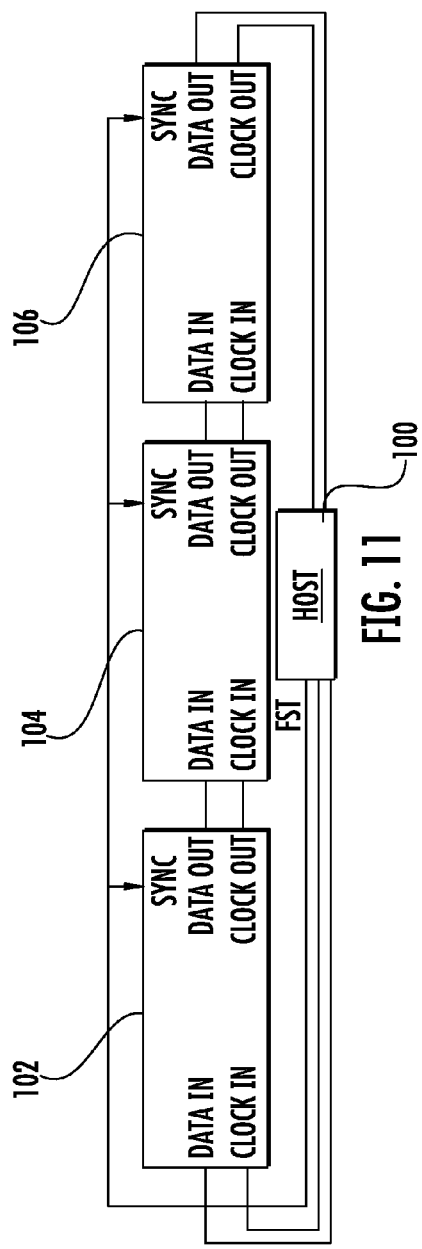
FIG. 11 illustrates a first example mechanism for synchronizing exposure of a device, according to the present invention.

FIG. 11 shows an example wherein a host 100 generates a frame start pulse FST. This method simplifies the design of the sensors 100-106 as the sensors need to be only slave devices. An extra connection may be implemented between the host 100 and the sensors.

Figure 12:
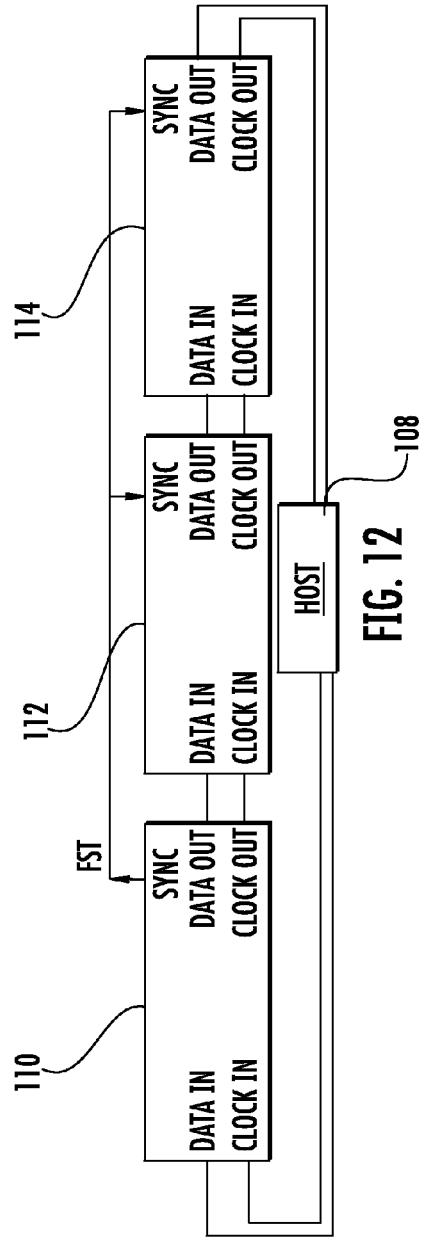
FIG. 12 illustrates a second example mechanism for synchronizing exposure of a device, according to the present invention.

An alternative method for synchronization is shown in FIG. 12. Here, the FST pulse is generated by the first sensor 110 in the daisy chain. To identify the "first" sensor, it would be possible to have a different design and part number for the first sensor 110. This could however be avoided. All sensors could have the same design and the "sync" pad could be input or output (e.g. bi-directional buffer or open-drain type of pad). During operation, each of the sensors could be arranged to detect that it was the first sensor in the chain if it sees no data between LS and LE data packets (as with the example shown in FIG. 3) or that there was no LS/LE in between the FS and FE data packets (as with the example shown in FIG. 6). Once a sensor had detected it was the first in the chain, it would then act as the exposure synchronization master and output FST while the other devices listened for FST on the sync pad.

As this system transmits of a frame before the master could be determined, the system would not be synchronized until the second frame. The first frame of data should be discarded by the host as the system would not have been synchronized.

It is not important which sensor in the chain is synchronization master. It could be the last sensor, but any sensor is able only to determine its position on the chain (1st, 2nd etc.) but not how long the chain is and hence not determine if it is the last.

An alternative approach to having the first sensor in the chain becoming the exposure master would be for each sensor to wait a random period on power up. During this wait period, it would listen to see if another sensor asserted the FST line. If the sensor saw the FST asserted, it would become a slave. If it didn't see the FST asserted during its (random value) wait, it would become the master.

In systems as described above, it is advantageous in various embodiments to be able to address individual sensors.

Figure 13:
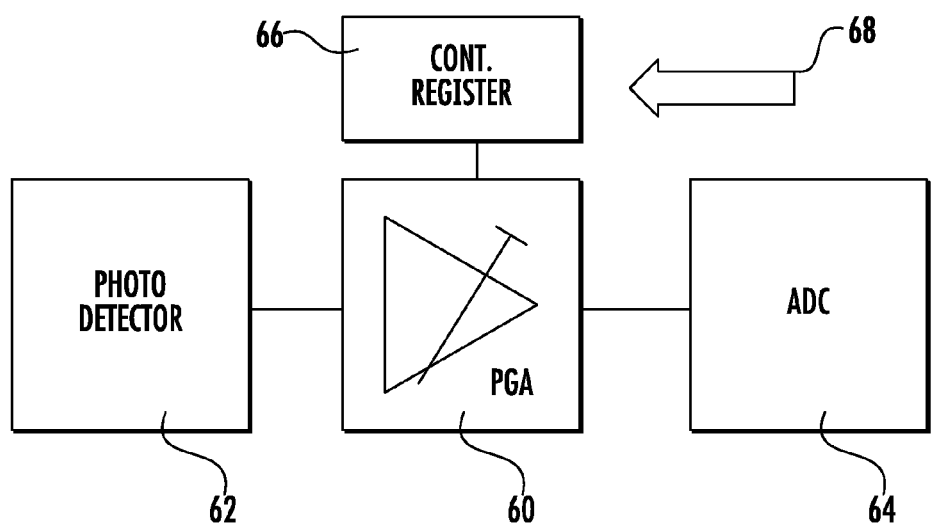
FIG. 13 shows a photodetector with a programmable gain adjustment, according to the present invention.

For example, due to manufacturing variations, the gain of each sensor may be different, which affects the color output. To avoid artifacts in the final image, it is advantageous to correct for these gain mismatches, preferably on the sensor. One approach is to use a programmable gain amplifier (PGA) between the photodetector and analogue to digital converter (ADC). This is shown in FIG. 13, in which a PGA 60 is provided between photo detector 62 and ADC 64. The PGA is controlled by a control register 66 which receives control signal 68 from the host.

FIG. 13 shows one PGA 60 provided for the photodetector 62. However, in an alternative embodiment it is possible to provide a separate PGA for each channel (R, G, B) on each image sensor.

The gain setting for the control register 66 for controlling the PGA can determined either during manufacture or calibration of the image sensor, or during operation of the image sensor.

It therefore becomes necessary to control each of the image sensors independently of the others in the array. In the prior art an addressing mechanism would usually involve adding separate address lines with associated pins for connection to the image sensor integrated circuit. These additional pins to be added to the device complicate the assembly of the system.

In contrast to this prior technique, it is possible to produce an identification value which is unique to that sensor for in the array. To do so, each sensor counts the number of data values between the line start and line end packets, and its position within the array is calculated based upon this count.

Because the length of the line of data is dependent upon the number of pixels and hence the number of sensors, the number of pixels that each sensor sees at its input (or output) is different.

It is possible simply to use the raw number of pixels as an identification number representing the image sensor identity. However, this embodiment has fairly limited applicability, due to the combination of a large number of pixels that may be present in an array and limitations of the addressing schemes used for the applicable control bus connection protocols. For example, if the I²C protocol is used, there are a maximum of 127 different addresses and the number of pixels on a typical array may far exceed this value.

Therefore in preferred embodiments, a mechanism is used to produce a smaller number from the larger number of pixels, and that smaller number is used as an identification code representing the position of the image sensor in the array. Various methods may be employed for obtaining the identification code number, that is, for obtaining a smaller number based on a larger number.

If the number of pixels per sensor is known and all the sensors are the same size, it is possible to simply divide the number of pixels per data line by the number of pixels per sensor to get a sensor identification number. Table 1 gives an example for a sensor with 10,000 pixels daisy chained as described above.

TABLE 1

|  | Line Start | Line End | Number of pixels per data line | Position in chain |
|---|---|---|---|---|
| Host Output | 1 | 2 | 0 | 0 |
| Sensor #1 output | 1 | 10,002 | 10,000 | 1 |
| Sensor #2 output | 1 | 20,002 | 20,000 | 2 |
| Sensor #3 output | 1 | 30,002 | 30,000 | 3 |

The position of an image sensor in the chain is determined by dividing the number of pixels by the known value of 10,000 pixels (representing the number of pixels per sensor). The position in the chain is then used as an address for an addressing scheme. This simple linear scheme makes it straightforward for the host to determine the identification of each sensor. However, it has the disadvantage that it has each sensor divide by the number of pixels on each sensor, which is computationally expensive.

An alternative scheme can be applied if the number of pixels in each image sensor can be expressed as $2^N$, where N is an integer. The division can easily accomplished by truncating the number of bits used in enumerating the number of pixels. The first N bits of the number of pixels can be ignored. Table 2 illustrates an example of such a scheme, where an N=14, namely, there are $2^{14}$ pixels in each image sensor.

TABLE 2

|  | Line Start | Line End | Number of pixels per data line | Position in chain |
|---|---|---|---|---|
| Host Output | 1 | 2 | 0 | 0 |
| Sensor #1 output | 1 | 16,386 | 16,384 | 1 |
| Sensor #2 output | 1 | 32,770 | 32,768 | 2 |
| Sensor #3 output | 1 | 49,154 | 49,152 | 3 |

The number of pixels therefore increments by two to the fourteen each time, meaning that the first fourteen bits of the image data length may always be zero and only the bits higher than that may be used as image ID.

Similarly, if there happened to be $2^N+1$ pixels per image sensor, then the least significant bits can be used. The number of least significant bits used depends upon the number of sensors in each pixel array. If there are $2^b$ sensors, then b bits may be used. Table 3 is an example illustrating this principle, where N=14 and 0x denotes hexadecimal notation.

TABLE 3

|  | Line Start | Line End | Number of pixels per data line | Position in chain |
|---|---|---|---|---|
| Host Output | 1 | 2 | 0 | 0 |
| Sensor #1 output | 1 | 0x4003 | 0x4001 | 1 |
| Sensor #2 output | 1 | 0x8004 | 0x8002 | 2 |

TABLE 3-continued

|  | Line Start | Line End | Number of pixels per data line | Position in chain |
|---|---|---|---|---|
| Sensor #3 output | 1 | 0xC005 | 0xC003 | 3 |

It will be appreciated that the number of pixels in an image sensor can be deliberately chosen during manufacture, or by operation of selected pixels from within each sensor to enable these addressing schemes to be used.

A still further alternative embodiment is to simply sum the individual digits in the number of pixels. This scheme is illustrated in Table 4.

TABLE 4

|  | Line Start | Line End | Number of pixels per data line | Digit Sum |
|---|---|---|---|---|
| Host Output | 1 | 2 | 0 | 0 |
| Sensor #1 output | 1 | 0x4003 | 0x4001 | 5 |
| Sensor #2 output | 1 | 0x8004 | 0x8002 | 0xA |
| Sensor #3 output | 1 | 0xC005 | 0xC003 | 0xF |

Any other mechanism may be used to produce a smaller number from a larger one. The choice of the mechanism depends upon the number of pixels per sensor.

In alternative embodiments, the addressing scheme can be applied to arrays where the number of pixels varies from sensor to sensor.

Alternatively, the number of pixels in each image sensor can be the same, however one or more of the sensors could be in a mode of operation where only a subset of pixels are used, and the number of pixels in the subset of each respective image sensor could be different for one or more of the image sensors in the array.

For example, a 3D/stereoscopic vision system might comprise two 2D sensors, and a region of interest could be selected for each camera (e.g. via I2C) and daisy-chained to the host. The host could indicate to a first sensor that it should output a region of interest of a particular (pixel array) size at a particular addressed region of the first image sensor's array, and indicate to a second sensor that it should output a region of interest of a second particular (pixel array) size at a particular addressed region of the second image sensor's array. The size of the region of interest selected in the first image sensor might be different from the size of the region of interest selected in the second image sensor. Having commanded the sensors, the host is then able to take a first set of pixels in the datastream corresponding to the size of the first region of interest and allocate it to the software (or buffer) processing the first sensor, and allocate a second subsequent set of pixels in the datastream corresponding to the size of the second region of interest and allocate it to the software (or buffer) processing the second sensor.

The variations in pixel numbers will be known according to the pixel design or particular system configuration and so look-up tables or other algorithms can be used to compare the number of pixels which are processed by each image sensor in the daisy chain.

Application of the present disclosure solves a number of problems. In contrast to the prior art situation of having one sensor with multiple output channels, the invention provides multiple sensors on a single channel. An array of image sensors can be provided with minimal interconnection, thereby reducing the size of the image sensing array compared to the prior art techniques and increasing the reliability of the array. Because the size of an individual sensor is reduced, the yield is higher and so the cost is reduced.

Figure 14:
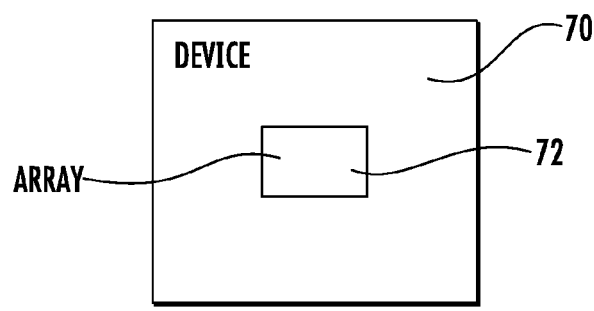
FIG. 14 shows a device incorporating an array of image sensors, according to the present invention.

Image sensor arrays according to the invention can be incorporated in a wide variety of devices. FIG. 14 shows an example of a device 70 incorporating an array 72 of image sensors according to the disclosure. The device may be without limitation a scanner (including hand held or a flat bed scanners), other document scanning equipment, industrial measurement equipment or machine vision equipment. The image sensor array 72 may be incorporated into that device 70 depending upon the nature of the device in a manner which is known to a person skilled in the art and which does not require further exemplification herein.

Various improvement and modifications can be made to the above without departing from the scope of the invention.

The invention claimed is:

1. A document scanner comprising:
a plurality of image sensors arranged in side-by-side relation and configured to sense an image of a document positioned adjacent thereto, each of said plurality of image sensors comprising a pixel array;
said plurality of image sensors coupled together in a daisy chained arrangement and configured to operate so that a downstream image sensor appends image data to image data from an upstream image sensor;
a host coupled to the daisy chain arrangement and configured to insert identification codes to indicate specific parts of the image data, wherein the identification codes comprise at least one of
a first identification code to identify a start of a data stream and a second identification code to identify an end of the data stream, and
at least one further set of identification codes to identify a start and an end of the data streams associated with each image sensor.

2. The document scanner of claim 1, wherein each image sensor further comprises a clock input port and clock output port coupled to a corresponding pixel array.

3. The electronic device of claim 2, wherein each image sensor is configured to perform a phase adjustment to an input clock signal so that the image data and an output clock are synchronous.

4. The document scanner of claim 1, wherein the first identification code and the at least one further set of identification codes have values that are distinguishable from the image data.

5. The document scanner of claim 1, wherein the first identification code and the at least one further set of identification codes comprise at least one of a threshold red pixel value, a threshold green pixel value, and threshold blue pixel value.

6. The document scanner of claim 1, wherein the host is configured to synchronize exposure of said plurality of image sensors.

7. The document scanner of claim 1, further comprising a programmable gain amplifier configured to adjust the gain of at least one image sensor.

8. The document scanner of claim 1, further comprising a plurality of programmable gain amplifiers coupled to the image sensors, and a host configured to control the plurality of programmable gain amplifiers.

9. The document scanner of claim 1, wherein a given image sensor is configured to be addressed using an identification value and based upon a number of image data values that pass through the given sensor.

10. The document scanner of claim 9, wherein the identification value is generated by dividing the number of image data values output by a given image sensor by a number of corresponding pixels of the given image sensor.

11. The document scanner of claim 9, wherein each given image sensor comprises 2N pixels and the identification value is based upon a number of image data values output by the given image sensor by discarding N bits of image data.

12. The document scanner of claim 9, wherein each image sensor comprises 2N+1 pixels and the identification value is based upon a number of image data values output by that image sensor by using a set of least significant bits of the image data values.

13. The document scanner of claim 9, wherein the identification value is based upon a summation of digits of individual image data values.

14. A document scanner comprising:
a plurality of image sensors arranged in side-by-side relation and configured to sense an image of a document positioned adjacent thereto, each of said plurality of image sensors comprising a pixel array, wherein a given image sensor, of the plurality of image sensors, is configured to be addressed using an identification value and based upon a number of image data values that pass through the given sensor;
said plurality of image sensors coupled together in a daisy chained arrangement and configured to operate so that a downstream image sensor appends image data to image data from an upstream image sensor; and
a host coupled to an image sensor, of the plurality of image sensors, at an end of the daisy chain arrangement and configured to insert identification codes along with the image data, and synchronize exposure of said plurality of image sensors.

15. The document scanner of claim 14, wherein each image sensor further comprises a clock input port and clock output port coupled to a corresponding pixel array.

16. The electronic device of claim 14, wherein each image sensor is configured to perform a phase adjustment to an input clock signal so that the image data and an output clock are synchronous.

17. The document scanner of claim 14, wherein the identification codes comprise a first identification code to identify a start of a data stream and a second identification code to identify an end of the data stream.

18. The document scanner of claim 14, wherein the identification codes comprise a set of identification codes to identify a start and an end of the data streams associated with each image sensor.

19. The document scanner of claim 14, further comprising a programmable gain amplifier configured to adjust the gain of at least one image sensor.

20. The document scanner of claim 14, wherein the identification value is generated by dividing the number of image data values output by a given image sensor by a number of corresponding pixels of the given image sensor.

21. A method of document scanning comprising:
sensing an image of a document positioned adjacent a plurality of image sensors arranged in side-by-side relation and coupled together in a daisy chained arrangement, each of said plurality of image sensors comprising a pixel array; and operating the daisy chained arrangement so that a downstream image sensor appends image data to image data from an upstream image sensor; and inserting identification codes to an end of the daisy chained arrangement, the identification codes indicating specific parts of the image data; wherein the identification codes comprise at least one of
- a first identification code to identify a start of a data stream and a second identification code to identify an end of the data stream; and
- at least one further set of identification codes to identify a start and an end of the data streams associated with each image sensor.

22. The method of claim 21, comprising performing a phase adjustment to an input clock signal to an image sensor so that image data and an output clock are synchronous.

23. The method of claim 21, wherein the first identification code and the at least one further set of identification codes have values that are distinguishable from the image data.

24. The method of claim 21, wherein the first identification code and the at least one further set of identification codes comprise at least one of a threshold red pixel value, a threshold green pixel value, and threshold blue pixel value.

25. The method of claim 21, further comprising synchronizing exposure of the plurality of image sensors.

26. The method of claim 21, further comprising programming a gain of at least one image sensor.

* * * * *